Aug. 7, 1945.  M. SCHLUMBERGER  2,381,081
GUN PERFORATOR
Filed Jan. 23, 1940  5 Sheets-Sheet 1
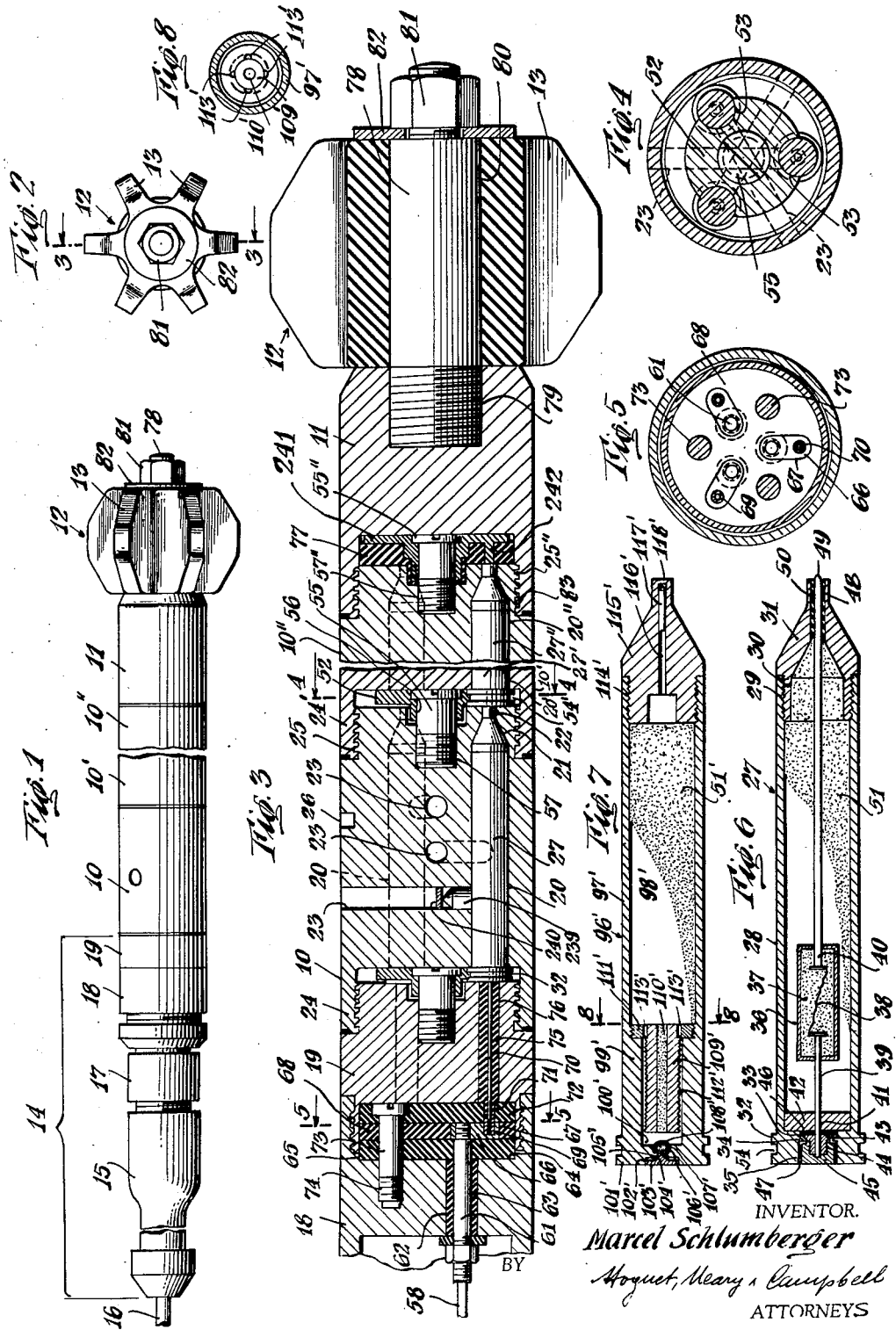
INVENTOR.
Marcel Schlumberger
BY Hoguet, Neary & Campbell
ATTORNEYS

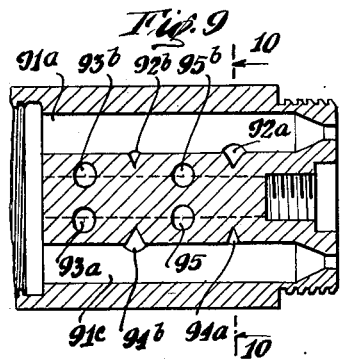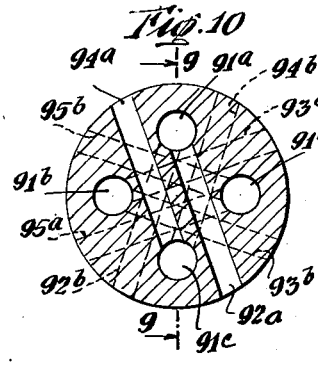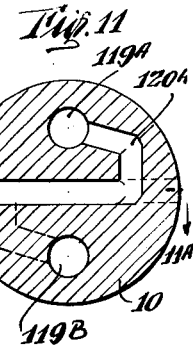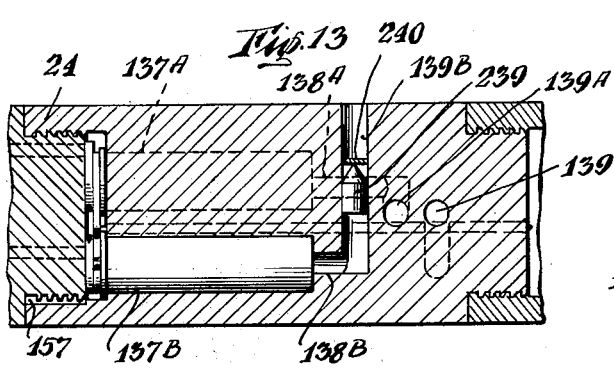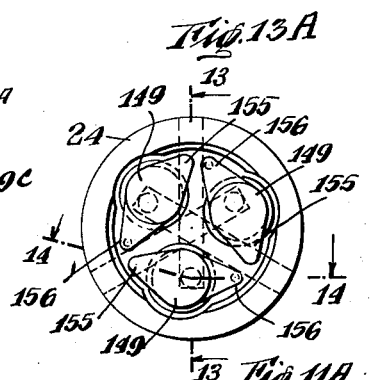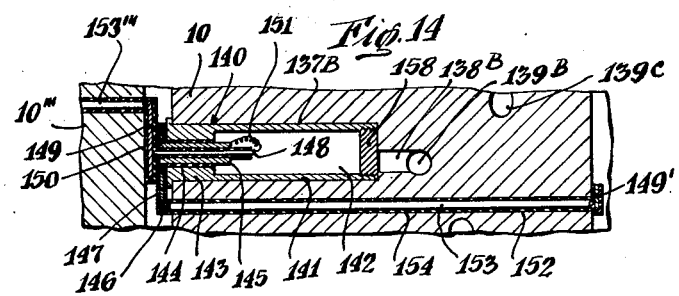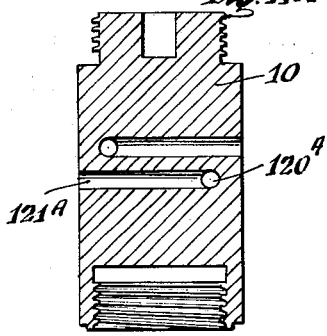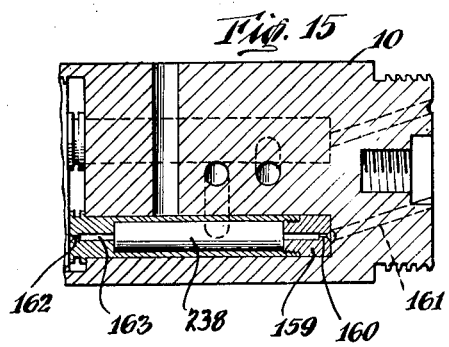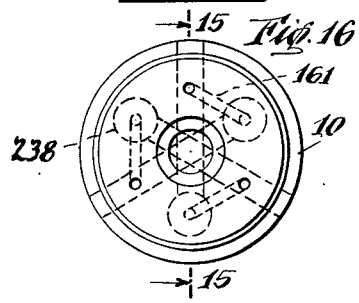

Aug. 7, 1945.   M. SCHLUMBERGER   2,381,081
GUN PERFORATOR
Filed Jan. 23, 1940   5 Sheets-Sheet 3
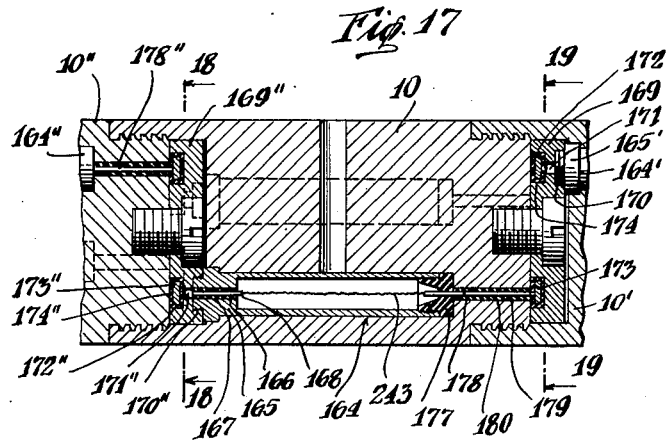
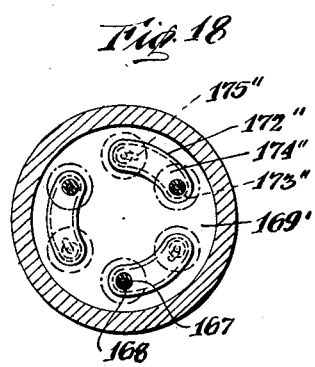
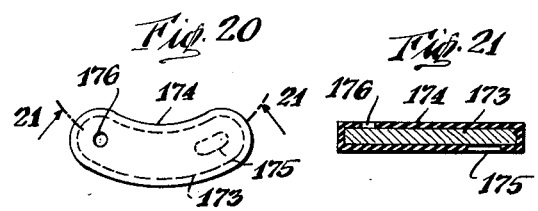
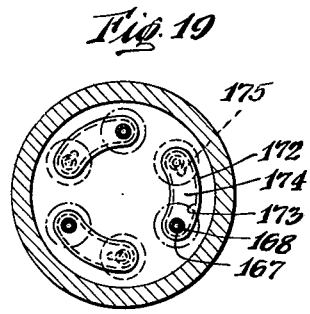
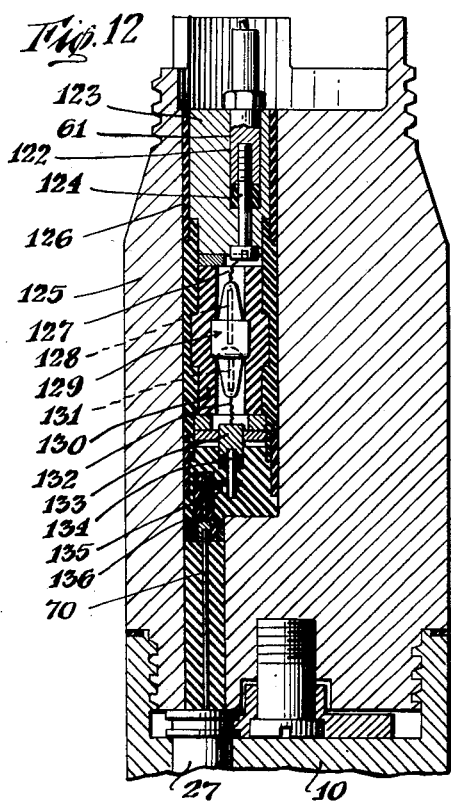
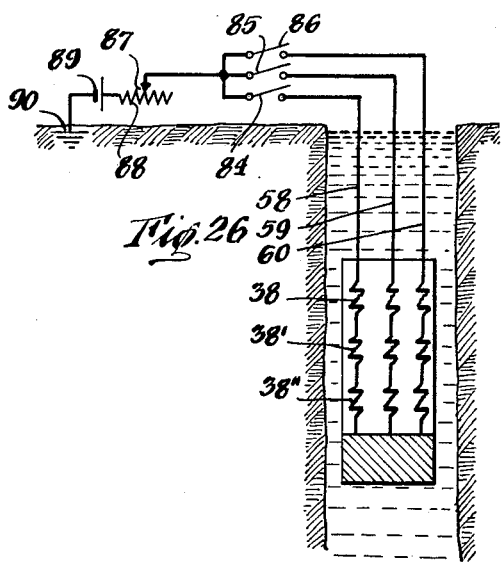
INVENTOR.
Marcel Schlumberger
BY
ATTORNEYS

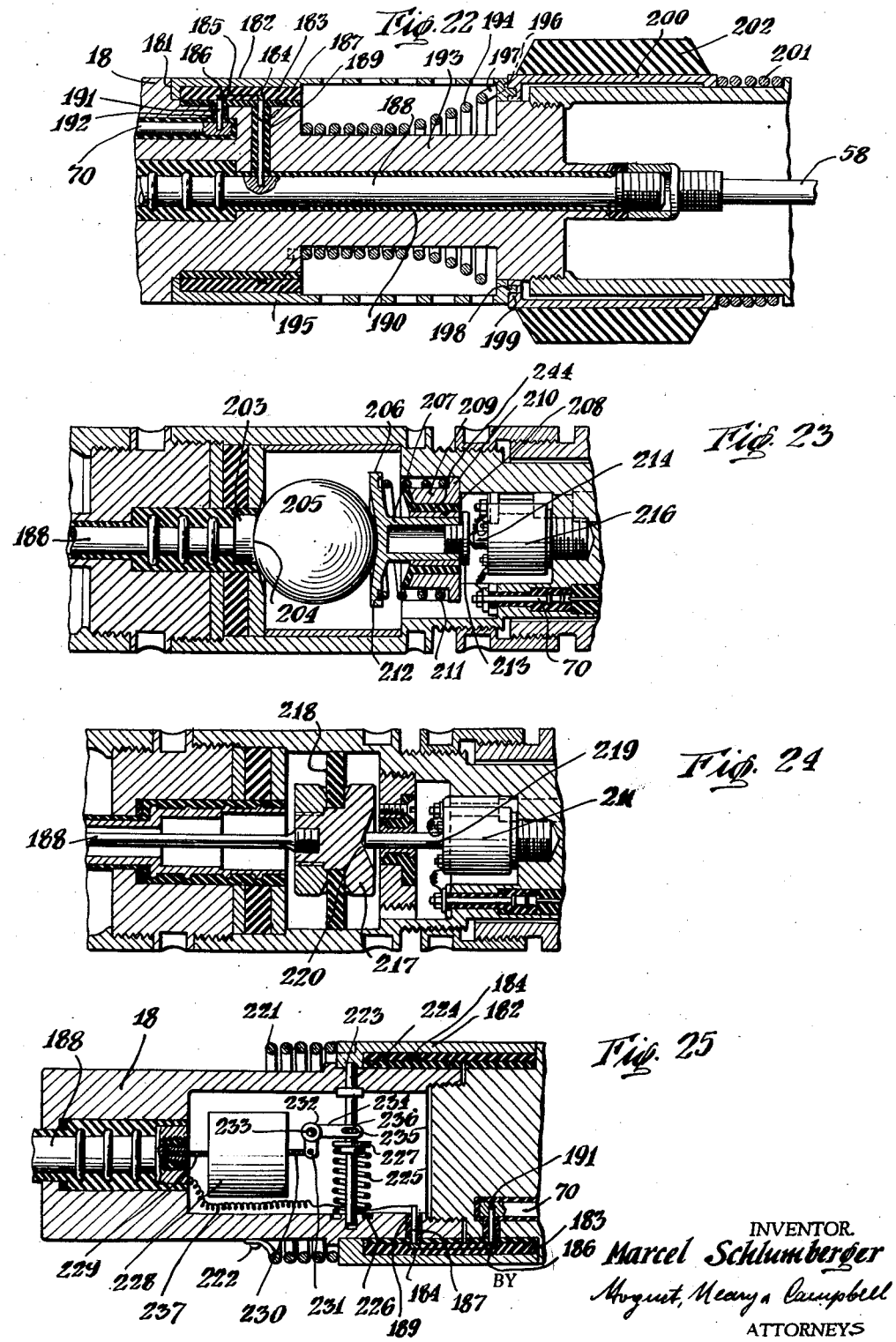

Aug. 7, 1945.   M. SCHLUMBERGER   2,381,081
GUN PERFORATOR
Filed Jan. 23, 1940   5 Sheets-Sheet 5
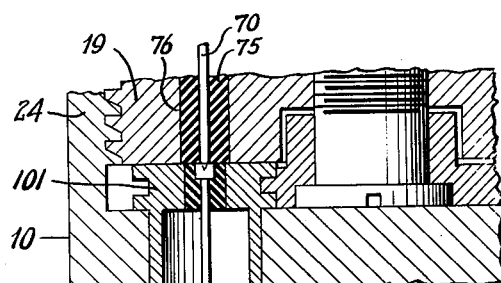
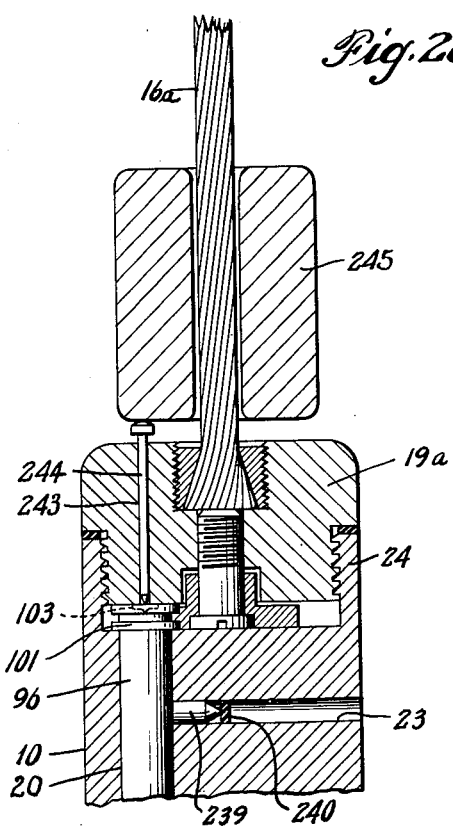
INVENTOR:
Marcel Schlumberger,
BY
Hoquet, Neary & Campbell
ATTORNEYS Patented Aug. 7, 1945

2,381,081

UNITED STATES PATENT OFFICE 2,381,081

GUN PERFORATOR

Marcel Schlumberger, Paris, France; vested in the Alien Property Custodian

Application January 23, 1940, Serial No. 315,157
In France February 2, 1939

25 Claims. (Cl. 164—0.5)

The present invention relates to firing devices, and more particularly to new and improved apparatus for perforating metallic casings, such as, for example, are used in oil wells.

A primary object of the invention is to provide apparatus for perforating metallic casings which is characterized by simplicity in handling and increased safety of operation.

Another object of the invention is to provide perforating apparatus which comprises a plurality of interchangeable gun units which may be conveniently assembled to form a perforator of the desired character.

A further object of the invention is to provide perforating apparatus having a simplified electrical circuit for firing the gun units of the system.

One feature of the invention resides in the provision of metal perforator units of elongated shape having at least two longitudinal powder chambers formed in the peripheral portion thereof, with at least one barrel hole extending from each chamber to the lateral wall of the unit and passing through the central portion thereof.

Another feature of the invention consists in providing a perforator structure including an assembly of a plurality of units mounted end to end in series without any common support, each of the units being provided with powder ignition means, adapted to be automatically interconnected from one unit to the next one upon assembly of the series of units so as to constitute at least one ignition circuit extending therethrough.

According to still another feature of the invention, the powder for each chamber is contained in a cartridge adapted to fit therein and each unit is provided with extracting means for simultaneously removing all the cartridges in the unit from their respective chambers, when it is detached from the adjacent one.

In an embodiment of the invention, each powder chamber contains one cartridge and the powder in the successive cartridges is ignited by electric means.

In another embodiment, corresponding cartridge chambers of the successive units are adapted to communicate with one another in series and the combustion of the first cartridge of a series produces the successive ignition of the other cartridges thereof with the interposition of ignition delaying means, so as to ensure a sufficient interval of time between the firing of two consecutive cartridges.

According to an embodiment of the present invention, the connection between each chamber and the next one is inclined with respect to the axial direction of the apparatus so that the successive cartridges of the series being fired are not located along the same generatrix but are disposed along a helix.

According to still another embodiment of the present invention, the apparatus includes, in series with the electrical circuit, a circuit breaker which, each time a cartridge is fired, is adapted to be operated for the purpose of interrupting, for verification purposes, the current flowing through an indicating circuit.

Still another embodiment of the invention consists in the provision of a switch automatically operated by the firing of each cartridge, which switch is interconnected with the electrical means for firing the cartridges in such a manner that the successive cartridges ignited are located on a helix instead of being located on a straight line parallel to the axis.

Other features of the present invention will become apparent from the following detailed description of several specific embodiments taken with reference to the appended drawings, in which:

Fig. 1 is a view in elevation of a perforating gun constructed in accordance with the present invention;

Fig. 2 is an end view of the gun shown in Fig. 1;

Fig. 3 is a view in longitudinal section of a portion of the perforator of Fig. 1 taken along the line 3—3 of Fig. 2;

Fig. 4 is a view in transverse section taken along the line 4—4 of Fig. 3;

Fig. 5 is a view in transverse section taken along the line 5—5 of Fig. 3;

Fig. 6 is a sectional view of a cartridge constructed according to the present invention;

Fig. 7 is a sectional view of a modified form of cartridge;

Fig. 8 is a view in section taken along line 8—8 of Fig. 7;

Fig. 9 is a view in section taken along line 9—9 of Fig. 10 and illustrating a modified form of perforator unit;

Fig. 10 is a sectional view taken along line 10—10 of Fig. 9;

Fig. 11 is a view in transverse section illustrating another modified form of perforator unit;

Fig. 11A is a view in section taken along line 11A—11A of Fig. 11;

Fig. 12 is a view in longitudinal section of a head unit provided with an automatic circuit breaker for verification purposes;

Fig. 13 is a view in longitudinal section taken along line 13—13 of Fig. 13A, illustrating still another form of perforator element;

Fig. 13A is a left end view of the perforator unit 24 shown in Fig. 13 with the cartridges in position in the cartridge chambers therein;

Fig. 14 is another sectional view taken along line 14—14 of Fig. 13A, showing a cartridge inserted in position, and illustrating the firing circuit therefor;

Fig. 15 is a view in longitudinal section taken along line 15—15 of Fig. 16 of a modified form of perforator unit in which a cartridge is adapted to be ignited by the powder gases from a cartridge in a preceding unit;

Fig. 16 is a front end view of the perforator unit shown in Fig. 15;

Fig. 17 is a view in longitudinal section of a further modified form of perforator unit;

Fig. 18 is a sectional view taken along line 18—18 of Fig. 17;

Fig. 19 is a sectional view taken along line 19—19 of Fig. 17;

Fig. 20 is a plan view of a detail of the unit shown in Fig. 17;

Fig. 21 is a view in section taken along line 21—21 of Fig. 20;

Fig. 22 is a view in longitudinal section of a head unit provided with a switch for controlling the order of ignition of the cartridges in the perforator units;

Figs. 23, 24 and 25 are also views in longitudinal section of further modifications of the head unit shown in Fig. 22;

Fig. 26 is a schematic diagram illustrating the electrical firing circuits for the gun perforator shown in Fig. 1;

Fig. 27 is a view in longitudinal section illustrating electrical means for igniting the first of a group of cartridges like the cartridge shown in Fig. 7; and Fig. 28 is a view in longitudinal section illustrating mechanical means for firing the first of a group of cartridges like the cartridge shown in Fig. 7.

Considering Fig. 1, the gun perforator comprises a plurality of interchangeable perforating units 10, 10' and 10", threadedly secured to one another. The lowermost perforator unit 10" is connected to an end piece 11 to which is secured a rubber guiding member 12 provided with a plurality of radial fins 13 which serve to maintain the perforator in a substantially central position in a bore hole.

The uppermost perforator unit 10 is threadedly connected to a head piece 14, including a guide member 15 for the cable 16 on which the perforator assembly is adapted to be suspended in a bore hole, a coupling member 17 and two separable connector units 18 and 19. Within the units 18 and 19 is contained apparatus for connecting the electrical circuits of the perforator elements 10, 10' and 10" to the various conductors in the cable 16 as will be described in greater detail hereinafter.

Inasmuch as the perforator units 10, 10' and 10" are identical in construction, it will be sufficient to describe only the perforator unit 10 in detail. Corresponding parts on the units 10' and 10" will accordingly be designated by the corresponding primed or double primed numbers, respectively.

Referring to Fig. 3, the perforator unit 10 may comprise, for example, a cylindrical unit provided with three cartridge chambers 20, two of which are shown in the figure, which are disposed parallel to the axis of the unit and the axes of which pass through the apices of an equilateral triangle located in a plane at right angles to its axis. Each chamber 20 is provided with a lower tapered portion 21 terminating in a small passage 22 in the lower face of the unit 10.

In this embodiment of the invention each cartridge chamber 20 is provided with a barrel hole 23 passing through the axis of the unit and extending from each chamber 20 to the external wall of the unit diametrically opposed thereto.

The barrel holes 23 are preferably located in three different transverse planes as shown in Fig. 4. Within the barrel holes 23 are inserted the bullets 239 which are held in position by suitable plugs 240 which also serve to prevent the inflow of water into the chambers 20.

The unit 10 is provided at one end with an internally threaded skirt portion 24 and at the other end with an externally threaded portion 25 of reduced diameter, whereby it may be secured to the adjacent perforator units constituting the apparatus. A recess 26 is provided in the external wall of the perforator unit 10 which is adapted to cooperate with a tool to be used for assembling the respective units of the apparatus.

Within each cartridge chamber 20 is disposed a cartridge 27, shown in greater detail in Fig. 6, which is adapted to be fired electrically as described in detail hereinafter. Referring to Fig. 6, the cartridge 27 comprises a metallic tubular casing 28, the front end of which is internally threaded at 29 to receive the externally threaded portion 30 of a conical closure member 31. The rear end of the tubular casing 28 is provided with a closure member 32 within which is formed a circular aperture 33 tapering rearwardly to a restricted portion 34 which communicates with a larger circular recess 35 formed in the rear face of the rear closure member 32.

The firing device for the cartridge 27 comprises an enclosed tubular casing 36 made of some low resistance material which contains a small amount of powder 37. The powder 37 is adapted to be ignited by a wire filament 38 which is connected at one end to a conducting rod 39 and at its other end to a conducting rod 40. The conducting rod 39 extends through the tubular casing 36, through an aperture 41 in an ebonite plug 42 which is snugly fitted against the rear closure member 32 and into the recess 35. Secured at the end of the conducting rod 39 is a conical contact member 43 provided with a threaded portion 44 on which a second contact member 45 is adapted to be screwed.

The contact members 43 and 45 are maintained out of contact with the rear closure member 32 by an insulating disc 46 disposed between the rear face of the ebonite plug 42 and the rear face of the conical contact member 43 and by a ring 47 of insulating material which is inserted in the space between the second contact member 45 and the wall bounding the circular recess 35.

The conducting rod 40 extends through the other end of the tubular casing 36 and through a narrow bore 48 formed in the conical closure member 31 and it has a pointed end 49 which extends slightly beyond the forward extremity of the conical closure member 31. A sleeve 50 of insulating material is fitted on the conducting rod 40 which serves to insulate the latter from the conical closure member 31.

The pointed end 49 of the rod 40 of each cartridge 27 is adapted to bear against the contact member 45' of the corresponding cartridge 27' of the next perforator unit 10', so as to insure electrical contact therewith. Electric current can then flow through contact members 43 and 45, rod 39, filament 38, and rod 40 of perforator unit 10, to the cartridge 27' in perforator unit 10', and thus to the entire series of cartridges in the assembled apparatus.

In accordance with the invention, the perforator element 10 is provided with means for extracting the cartridges 27' from the cartridge chambers 20' of the adjacent lower perforator unit 10'. The extracting means comprises a circular disc 52 provided with a plurality of spaced semi-circular notches 53 (Fig. 4), the centers of which are disposed at the apices of an equilateral triangle, within each of which a cartridge 27 is adapted to be received. To this end, an annular recess 54 is provided about the periphery of the rear closure member 32 of each cartridge 27 within which the semi-circular boundary of a notch 53 is adapted to be received.

The disc 52 is adapted to be secured to the lower face of the perforator unit 10 by means of a tap screw 55 which extends through a central bore 56 in the disc 52 into an internally threaded bore 57 in the perforator unit 10. The tap screw 55 is provided with a left-hand thread and the assembly is so designed that when it has been tightened up the disc 52 may be rotated freely about its axis.

In operation, three cartridges 27' are inserted into the notches 53 in the extracting disc 52 and the latter is secured to the perforator unit 10 by means of the tap screw 55. The perforator unit 10 is then brought into proximity with the perforator unit 10', for example, and the cartridges 27' are inserted into the cartridge chambers 20' disposed therein. The externally threaded reduced portion 25 of the perforator unit 10 is then screwed into the internally threaded skirt portion 24' of the perforator unit 10'. Inasmuch as the extracting disc 52 may rotate freely about the tap screw 55, this operation may be performed with facility.

After the cartridges 27' have been fired and the apparatus has been withdrawn from the bore hole, the perforator unit 10 is unscrewed from the perforator unit 10'. Since the thread on the reduced portion 25 of the perforator unit is right-handed, whereas the tap screw 55 is provided with a left-hand thread, the latter cannot be unscrewed from the perforator unit 10 during this operation. Hence, as the unscrewing operation proceeds and the perforator unit 10 moves axially away from the perforator unit 10', the cartridges 27' are extracted from the cartridge chambers 20' and are retained by the extracting disc 52 from which they may be subsequently removed.

As indicated above, the uppermost perforator unit 10 is threadedly connected to a head piece 14 which includes means for connecting the firing circuits of the cartridges 27 to the conductors in the cable 16. Inasmuch as the three circuit connections in the head piece 14 are identical, it will be sufficient to describe merely one.

Electrical energy for firing the cartridges 27 is supplied through the cable 16 which is provided with three conductors 58, 59 and 60 (Fig. 26), one for each series of cartridges 27 in the perforating apparatus. Each of the conductors 58, 59 and 60, respectively, is connected to a conducting rod 61 (Fig. 3) which extends through a passage 62 formed within the connector unit 18 and which is insulated therefrom by means of an insulating sleeve 63. The rod 61 extends through an insulating disc 64 disposed within a circular recess 65 formed by the cooperating adjacent ends of the connector elements 18 and 19, and its upper end is connected to a contact element 66 mounted within a recess 67 in a second insulating disc 68, also disposed within the recess 65.

The contact element 66 is provided with a socket 69 within which a conducting rod 70 is adapted to be snugly received. The conducting rod 70 passes through an aperture 71 in a third insulating disc 72 disposed on the top of the insulating discs 64 and 68. The three discs 72, 64 and 68 are held tightly in position by means of the tap screws 73 which are screwed into the threaded bores 74 in the connector element 18. The conducting rod 70 extends through an insulating sleeve 75 within a narrow bore 76 in the connector element 19 and it terminates at its upper extremity in a point which is adapted to engage the contact member 45 on the cartridge 27 in the uppermost perforator unit 10, which is secured to the connector unit 19.

The connector unit 19 is also provided with means for extracting the cartridges 27 from the cartridge chambers 20 in the uppermost perforator unit 10. This means is identical with the means described above in connection with the perforator unit 10.

The lowermost perforator unit 10'' is provided with a circular rotatable disc 241 which is secured thereto by means of the tap screw 55'' which is adapted to be screwed into the threaded bore 57'' in the lower portion of the perforator unit 10''. The circular disc 241 is provided with three sector-shaped projections 242 which are adapted to engage the pointed ends 49'' of the conducting rods 40'' in the cartridges 27'' in the lowermost perforator unit 10''. The disc 241 is adapted to be maintained in close contact with the end piece 11 when the lowermost perforator unit 10'' is screwed thereto and it is insulated from the lower face of the element 10'' by a rubber disc 77.

A spindle 78 is screwed into a threaded bore 79 in the end piece 11 and it extends through a central bore 80 in the guide member 12 which is secured thereon by means of a nut 81 and a washer 82 of the conventional type.

To assemble the perforating apparatus described above, the lowermost perforator unit 10'' is first fixed upon a support. The cartridges 27'' for the perforator unit 10'' are then mounted in the extractor disc 52' of the next perforator unit 10' and the disc 52' is secured thereto by the tap screw 55'. The externally threaded reduced portion 25' of the second perforator unit 10' is then screwed into the internally threaded skirt portion 24'' of the lowermost perforator unit 10''. These operations are repeated until the perforator units 10, 10' and 10'' have been assembled. Obviously, any number of units may be used.

The perforator units 10, 10' and 10'' are so designed that, when assembled as indicated above, the cartridges 27 constitute three coaxially aligned groups. Each group of cartridges located along a generatrix of the apparatus constitutes an electric circuit extending over the entire length of the assembly, and there are three distinct electric circuits passing each through one of the three cartridge chambers 20 of each perforator unit.

The head piece 14 is then screwed in a similar manner on the uppermost perforator unit 10, thus connecting the three cartridge circuits to the three conductors 58, 59 and 60, respectively, in the cable 16. At this point the three cartridge circuits may be tested to determine if they are operative.

When the circuit tests have been successfully completed, the rubber disc 77 and the contact disc 241 are secured to the lowermost perforator unit 10'' by means of the tap screw 55'', the position of the disc 241 being such that the projections 242 thereon are in engagement with the pointed ends 49'' of the rods 40'' in the cartridges 27''. The externally threaded reduced portion 25'' of the perforator unit 10'' is then screwed into an internally threaded skirt portion 83 on the end piece 11, so as to insure a good electrical contact between the disc 241 and the end piece 11.

As shown generally in Fig. 26, the conductors 58, 59 and 60 in the cable 16 are connected to the switches 84, 85 and 86, respectively, which are connected to the variable contact 87 of a rheostat 88. The rheostat 88 is connected to one terminal of a source of current 89, the other terminal of which is connected to ground 90, the circuit being completed through the earth and the conducting well fluid to the body of the device.

In operation, the completely assembled perforator, supported on the cable 16 is lowered into the bore hole, the casing of which is to be perforated. When the desired depth is reached, the switch 84, for example, is closed, causing current to flow from the source 89, through the rheostat 88, the switch 84, the conductor 58, and through the filaments 38, 38' and 38'' of the cartridges 27, 27' and 27'', respectively. The filaments 38, 38' and 38'' are designed so that different current intensities are required to bring them to a red heat, the lowermost filament 38'' being adapted to attain a red heat at the lowest current intensity.

The rheostat 88 is adjusted to give the current intensity required to bring the lowermost filament 38'' to red heat, thus igniting the charge of black powder 37'' in the casing 36''. When the powder 37'' is ignited, the combustion thereof bursts the casing 36'' and thus transmits ignition to the explosive 51'' present in the cartridge casing 28''. The force of the explosion bursts the cartridge casing 28'' at the barrel hole 23'' and the powder gases released drive the bullet 239'' out of the barrel hole 23''.

At the time of the explosion, the ebonite plug 42'' is liquefied by the heat and pressure to which it is subjected and it pushes the insulating disc 46'' towards the rear so as to crush the metal contact member 43'' against the rear closure member 32''. The contact member 45'' is now in electrical contact with the rear closure member 32'' and with the metal of the perforator unit 10'' in which the exploded cartridge 27'' is located. Since the pointed end 49' of the conducting rod 40' of the preceding cartridge 27' is now connected with the metallic mass of the apparatus the firing circuit remains closed and operative.

The rheostat 88 is then adjusted to increase the current intensity to the value required to bring the next filament 38' to a red heat, and the operations are continued until the required number of cartridges are fired. The other two series of cartridges may be fired in exactly the same manner.

Figs. 9 and 10 relate to another embodiment of a perforator unit 10 constructed according to the present invention. In this modification, the perforator unit 10 is provided with a plurality of cartridge chambers 91a, 91b, 91c and 91d (four in the particular example shown by the drawings), the axes of which are symmetrically located therein with respect to two diametral planes located at right angles to each other. The cartridge chambers 91a, 91b, 91c and 91d are of the same general shape as those of the preceding embodiment.

The chief characteristic of the embodiment shown in Figs. 9 and 10 is that each cartridge chamber is provided with two barrel holes. For example, chamber 91a is provided with the barrel holes 92a and 92b; chamber 91b has also two barrel holes 93a and 93b; chamber 91c is provided with two barrel holes 94a and 94b; and chamber 91d has the barrel holes 95a and 95b.

It will be readily apparent that, since there is an even number of cartridge chambers diametrically opposed to one another, the barrels communicating with the chambers cannot pass through the axis of the perforator unit 10. As shown by the drawings, two barrel holes associated with each chamber are located respectively in two planes passing through the axis of the cartridge chamber which are symmetrical to each other with reference to the diametral plane passing through said axis. For example, the respective axes of the barrels 92a and 92b of chamber 91a are located in two planes which are symmerically located with reference to the diametral plane passing through the axis of chambers 91a and 91c.

The construction and operation of a gun perforator having units of this kind is wholly analogous to that described with reference to the first embodiment of this invention, with the difference that the firing of each cartridge drives two bullets into the casing.

Fig. 7 shows another embodiment of a cartridge made according to the present invention. This cartridge is adapted to be fired automatically by means actuated by the powder gases produced in the corresponding cartridge of the preceding perforator unit. Accordingly, cartridges of this type may be used in any perforating unit except the unit 10 at the top, and they may be used in the unit 10 when mechanical firing means of the type shown in Fig. 28 is provided. The cartridge shown in Fig. 7 includes a tubular metallic casing 96' having a thin walled forward portion 97' forming a main powder chamber 98' and a thicker walled rear portion 99' forming an auxiliary chamber 100' of lesser diameter.

The casing 96' is closed at its rear end by a transverse partition 101' in the rear face of which is formed a circular recess 102' which is adapted to receive a firing pin 103'. The firing pin 103' is provided with a conical portion 104' which is adapted to be projected through a small aperture 105' in the transverse partition 101' against a metallic cup 106' inserted in a recess 107' formed in the transverse partition 101', which contains a small disc of mercury fulminate 108' or other similar detonating explosive.

Disposed within the auxiliary chamber 100' is a hollow tubular member 109' containing a slow fuse composition 110' and having an outwardly extending flange 111' which is screwed within the casing 96' adjacent the thicker walled rear portion 99'. The tubular member 109' is externally threaded and it cooperates with the auxiliary chamber 100' to form a labyrinth-like passage 112' which communicates with the main chamber 98' through a plurality of apertures 113' formed in the flange 111' (Fig. 8).

The forward portion of the casing 96' is internally threaded at 114' to receive an externally threaded conical plug 115' having a narrow axial bore 116' within which is disposed a pin 117'. The forward end of the bore 116' is normally closed by a thin wall 118' which is adapted to be pierced by the pin 117' when the cartridge is fired.

The firing of a group of cartridges like the one described above may be initiated electrically or mechanically as shown in Figs. 27 and 28, respectively. In the electrically fired modification shown in Fig. 27, the first cartridge in the well casing perforator unit 10 is provided with an igniting filament 241 imbedded in the charge of powder 51 contained in the main powder chamber 98. The igniting filament 241 is grounded at one end to the metallic casing 96 of the cartridge and it is connected at its other end to a conductor 242 which is in engagement with the conducting rod 70 in the connector element 19.

In operation, electric current is supplied to the filament 241 through the conducting rod 70 and the conductor 242. This produces an explosion which forces the pin 117 in the bore 116 through the wall 118 against the firing pin 103' of the second cartridge. The impact forces the conical portion 104' of the firing pin 103' against the cup 106', thereby igniting the mercury fulminate 108' therein and simultaneously igniting the fuse composition 110' in the tube member 109'.

The fuse composition 110' now burns at a rate depending upon the ingredients from which it is made and these may be so chosen that the ignition of the explosive in the main powder chamber 98' will not take place until after a predetermined period of time has elapsed, corresponding to the interval which it is desired to produce between the firing of two successive cartridges. The gases produced by the burning of the composition 110' flow into the auxiliary chamber 100' through the labyrinth-like passage 112' and through the apertures 113' into the main chamber 98'. In traversing this path the gases are cooled to a considerable extent by expansion so that when they enter the main chamber 98' they are cool enough not to ignite the explosive 51 contained therein.

The combustion of the last remnants of the fuse composition 110' will ignite the powder in the main chamber 98', the gases from which will ignite the third cartridge in an analogous manner. In this fashion, all of the cartridges in this ignition path may be ignited successively.

If desired, the cartridge may be ignited mechanically by apparatus of the type shown in Fig. 28. In this figure the cartridge is identical with the cartridge shown in Fig. 7 and corresponding parts have been designated by unprimed reference numerals. Referring to Fig. 28, the cartridge is shown disposed in one of the powder chambers 20 in the well casing perforator. Within the connector element 19a, to which the perforating unit 10 is secured, there is formed a longitudinal bore 243 within which is disposed a firing pin 244, the lower end of which rests against the firing pin 103 of the cartridge.

When it is desired to ignite the cartridge in the chamber 20, a suitable weight 245 is dropped into the bore hole on the cable 16a by means of which the apparatus is suspended therein. The weight 245 eventually strikes the firing pin 244, driving it forcibly against the firing pin 103 and igniting the cartridge essentially as described above in connection with Fig. 27.

The embodiment illustrated in Figs. 11 and 11A of the drawings features only two cartridge chambers 119A and 119B, in each perforator unit 10, the axes of which are located in a common diametral plane. In this embodiment of the invention the barrel hole communicating with each cartridge chamber does not extend straight from the wall of the perforator unit, but is bent so that its main portion in which the bullet is adapted to be received is located in a diametral plane at right angles to the diametral plane of the axes of the two chambers.

For example, the cartridge chamber 119A communicates with a bent passage 120A which terminates in a barrel hole 121A extending between the two chambers 119A and 119B and at right angles to the common plane of their axes. An important feature of this modification, and of the modification described above, is that it provides a maximum barrel length enabling the bullet to pass through a relatively great distance before it is projected into the casing.

Fig. 12 illustrates a modified form of connector unit which is adapted to break a firing circuit each time a bullet is fired, thereby indicating to an operator at the surface that the firing operation has been successful. The general structure of the connector unit shown in Fig. 12 is analogous to that of the units 18 and 19 shown in Fig. 3 except that each of the conducting rods 61 is secured within a recess 122 in a conducting block 123 by means of a tap screw 124. The block 123 is insulated from the connector unit 125 by means of the insulating material 126.

The tap screw 124 is electrically connected through a wire 127 to one contact element 128 of a conventional type mercury switch 129 which is vertically disposed within a rubber sleeve 130, and which contains just enough mercury to remain in contact with the contact unit 128 when the connector unit 125 is at rest. The other contact element 131 of the switch 129 is connected by means of a conductor 132 to a conductive block 133. The block 133 is connected by means of the conductors 134, 135 and 136 to the conducting rod 70 which is adapted to engage the contact member 45 on the cartridge 27 in the uppermost perforator element 10 (Fig. 3).

When the assembled perforator is at rest, the contact element 128 dips into the mercury in the switch 129 so that electric current flows normally therethrough to the firing circuit. However, when a shot is fired, the entire perforator assembly sustains a violent shock which displaces the mercury in the switch 129, thereby temporarily breaking the electrical firing circuit.

The break in the circuit may be readily indicated in any suitable manner, as, for example, by means of a receiver at the surface of the earth which is connected in series with the firing circuit. In this fashion, it is possible to check the firing of the shots by noting the break in the electrical circuit produced by the shock sustained by the perforator assembly.

Figs. 13, 13A and 14 illustrate a further modification of perforator unit 10 in which three cartride chambers 137A, 137B and 137C are provided, the axes of which are located parallel to the axis of the perforator unit 10, forming the respective edges of an equilateral prism coaxial thereto. In this embodiment the cartridge chambers 137A, 137B and 137C are provided at their lower extremities with the longitudinally extending conduits 138A, 138B and 138C, respectively, which communicate with the laterally extending barrel holes 139A, 139B and 139C, respectively.

It will be noted that the conduits 138A, 138B and 138C are made of different lengths so that the barrel holes 139A, 139B and 139C lie in different transverse planes. As shown in greater detail in Fig. 13, the barrel holes 139A, 139B and 139C are located in radial planes which are disposed at an angle of 120° with respect to each other.

It will be apparent that in this modification the electrical firing circuit cannot extend longitudinally throughout each cartridge as in the preceding embodiments. Accordingly, it is necessary to provide a special firing circuit as indicated in Fig. 14.

Referring to Fig. 14, a cartridge 140 is shown in position in the cartridge chamber 137B, for example, and it is provided with a thin walled forward portion 141 forming a main powder chamber 142 and a thicker walled rear portion 143 forming a passage 144. The front end of the cartridge is closed by a suitable closure member 158. Within the passage 144 is disposed a hollow tubular conducting member 145 which is provided with a metal plate 146 at the lower extremity thereof, the outer surface of both the plate 146 and the tubular member 145 being covered with suitable insulating material 147.

Disposed within the tubular member 145 and concentric therewith is a conducting rod 148 which extends for a short distance beyond the tubular member 145 into the chamber 142 of the cartridge 140, and which is provided at its lower extremity with a metal plate 149, the surface of the metal plate 149 and the conducting rod 148 being encased in suitable insulating material 150. A wire filament 151 for igniting the powder within the chamber 142 is connected at one end to the tubular member 145 and at the other end to the conducting rod 148 and the energizing circuit is traced through the conducting plate 149, conducting rod 148, wire filament 151, the tubular conducting member 145 and the plate 146.

Within the perforator unit 10 are provided three longitudinally extending bores 152, the axes of which are disposed substantially at the apices of an equilaterial triangle, each of which is adapted to accommodate a conducting rod 153, respectively. The rods 153 are provided with pointed ends which project slightly beyond the front and rear faces of the perforator unit 10 and they are insulated from the perforator unit 10 by sleeves of insulated material 154.

As shown in greater detail in Fig. 13A, each of the conducting plates 149 is provided with a projecting portion 155, and each conducting plate 146 is provided with a similar projecting portion 156. The cartridge 140 is so assembled that the projection 155 on plate 149 is disposed substantially 180° away from the projection 156 on the plate 146 and it is inserted into the cartridge chamber 137B in such fashion that the projection 156 on plate 146 is disposed adjacent the pointed end of one of the rods 153.

The perforator units are so designed that when the element 10''', for example, is screwed into the unit 10, the pointed end of the conducting rod 153''' of the perforator unit 10''' pierces the insulating layer 150 covering the projection 155 of the conducting plate 149 while the pointed end of the conducting rod 153 of the perforator unit 10 pierces the insulating layer 147 which covers the projection 156 of the conducting plate 146.

It will be apparent, therefore, that current flowing from the conducting rod 153''' of the preceding perforator unit 10''' will pass through the conducting plate 149, the conducting rod 148, the filament 151, the tubular conducting member 145, the conducting plate 146 and the conducting rod 153 of the perforator unit 10 to the contact plate 149' of the next perforator unit 10'. In this fashion current is supplied to each series of cartridges 140 in the assembled perforator.

It will be noted further that in this embodiment the transmission of current does not take place along the same generatrix of the perforator. On the contrary, the current path is along one generatrix in the perforator unit 10, then along a generatrix located at an angle of approximately 115° away on the next succeeding perforator unit 10', and so on through the respective units of the assembled apparatus.

In order that the cartridges 140 may be readily inserted within the respective cartridge chambers, the internally threaded skirt portion 24 of each perforator unit 10 may be suitably notched, as, for example, at 157.

In operation, the current through each filament 151 is adjusted as indicated above with reference to Fig. 26 until it is of sufficient intensity to ignite the powder contained within the cartridge 140. When this occurs the pressure of the gases ruptures the forward closure member 158 of the cartridge 140, thereby forcing the projectile 239 out of the barrel hole 139B.

As soon as the projectile 239 has left the barrel hole 139A, the liquid usually present in the bore casing flows through the barrel 139B and the passage 138B into the main chamber 142 of the cartridge 140 so that the firing circuit which was broken by the destruction of the filament 151 is now completed through the liquid. In addition, the destruction of the insulating material 147 and 150 by the explosion has the effect of grounding the broken end of the firing circuit to the mass of the assembled apparatus.

Figs. 15 and 16 illustrate another embodiment of the invention in which ignition is automatically transmitted from one cartridge to another cartridge located along a different generatrix, the radial plane of which makes a given angle with the radial plane of the generatrix corresponding to the preceding cartridge. In this embodiment each cartridge 238 is provided with a forward closure portion 159 having a very narrow bore 160 formed therein. The bore 160 is adapted to register with a narrow inclined passage 161 formed in the perforator unit 10, which extends to the cartridge 238' located on a different generatrix in the next perforator unit 10'.

In this embodiment when the cartridge 238 is fired the powder gases pass through the narrow bore 160 in the forward closure member 159 of the cartridge 238 to the inclined passage 161 where they are allowed to expand. The expanded gases then pass to the rear end of the cartridge 238' in the next perforator element 10'. Here the gases flow through a restricted aperture 162', and through a passage 163' to the powder contained within the cartridge 238' which is ignited thereby.

The passage through the restricted bore 160 and the subsequent expansion in the inclined passage 161 produces a delay in the transmission of ignition so that a certain interval of time elapses between the firing of the successive cartridges. The firing of the cartridges in this embodiment is effected by using in the first perforator unit 10 an electrically or mechanically ignited cartridge similar to those shown in Figs. 27 and 28.

In the embodiment shown in Fig. 17, the cartridge 164 is provided with a rear closure member 165 having a passage 166 therein within which is disposed an insulating sleeve 167 having a contact rod 168 therein. In this modification an extractor disc 169 is used which is provided with threaded recesses 170 within which the rear closure members 165' of the cartridges 164' for the next perforator unit 10' are adapted to be screwed. Each threaded recess 170 communicates through a narrow passage 171 with a larger sector-shaped recess 172 formed in the lower face of the extractor disc 169 within which is adapted to be received a metallic plate 173 of approximately the same shape, which is enclosed in insulating material 174.

As shown in Figs. 20 and 21, a small portion of the insulation is removed from the lower face of the plate 173 forming a slot 175 and part of the insulation is removed from the upper face of the plate 173 to form a small hole 176, which is adapted to register with the narrow passage 171 in the disc 169 when the plate 173 is disposed in the recess 172 formed therein.

The cartridge 164 is provided with a forward closure member 177 made of insulating material in which is inserted a conducting rod 178. The conducting rod 178 is enclosed in a sleeve 179 of insulating material within a passage 180 in the perforator unit 10 and it is provided with a pointed end which is adapted to project through the slot 175 into engagement with one of the plates 173 in the extractor disc 169. A wire filament 243 is connected between the contact rod 168 and contact rod 178 which serves to ignite the powder in the cartridge 164.

When the perforator units 10", 10 and 10' are assembled as in Fig. 17, it will be noted that the contact rods 178" of the cartridges 164" in perforator unit 10" extend through the lower slots 175" in the insulation 174" into engagement with the contact plates 173", and that the contact rods 168 of the cartridges 164 in the perforator unit 10 project through the upper holes 176" into engagement with the contact plates 173", as shown in Fig. 18. Similar connections obtain between the perforator units 10 and 10', as indicated in Fig. 19, so that three continuous firing circuits are produced in the assembled perforator.

It will be apparent that in this modification the successive cartridges 164 through which the firing current passes are located in different radial planes, the angle between the two successive radial planes being approximately equal to the angle subtended by the contact plate 173.

In all of the embodiments described above, three or more electrical circuits in the assembled perforator are electrically connected to three or more conductors in the cable 16. If desired, however, a single conductor might be used, together with mechanism as indicated in Figs. 22 to 25, inclusive, which is adapted to connect the cable successively to each of the circuits in the perforator assembly. These modifications are designed to switch the connection automatically from one series of cartridges to the next whenever a shot is fired.

Referring to Fig. 22, the connector unit 18 is formed with a shouldered portion 181, on which a metallic sleeve 182 is adapted to be rotatably mounted. Within the lower portion of the sleeve 182 is disposed an insulating sleeve 183 in which is embedded a conducting ring 184. The conducting ring 184 is electrically connected through a conductor 185 to a conducting sector 186 which is also embedded in the insulating material 183.

The conducting ring 184 is maintained in engagement with a contact rod 187 which is electrically connected to an axial conducting rod 188 connected at its upper extremity to a conductor 58 in the cable 16. The conducting rod 187 is insulated from the mass of the perforator unit by an insulating sleeve 189 and the axial conducting rod 188 is insulated in a similar manner by an analogous insulating sleeve 190. Each of the conducting rods 70 which carry current to the respective cartridge circuits, has secured thereto a radially extending contact rod 191 which is disposed within an insulating sleeve 192 and which is adapted to engage the contact sector 186 as the sleeve 182 is rotated with respect to the connector unit 18.

The connector unit 18 is provided with a portion 193 of reduced diameter on which is disposed a coil spring 194, one end of which is secured to the connector unit 18 at the point 195 and the other end of which is secured to a link 197 which is connected to the rotatable sleeve 182 at the point 196. The spring 194 tends to rotate the sleeve 182 with respect to the connector unit 18.

The rotatable sleeve 182 is provided with a plurality of longitudinal extending teeth 198 which are adapted to be received in corresponding recesses 199 formed in a sleeve 200 which is carried on the connector unit 18 so as to be slidable axially without rotation thereupon. The sleeve 200 is normally urged downwardly by means of a coil spring 201, thereby engaging the teeth 198 on the sleeve 182 in the recesses 199 provided in the sleeve 200, and locking the sleeve 182 in position. Mounted on the sleeve 200 is a rubber ring 202 which is of substantially the same diameter as the diameter of the bore hole.

Before a cartridge may be fired, the position of the sleeve 182 with respect to the connector unit 18 must be such that one of the contact rods 191 is in engagement with the sector 186. When this condition obtains, a circuit is completed from the conductor 58 through the conducting rod 188, contact rod 187 engaging contact ring 184, conductor 185, contact segment 186 engaging contact rod 191, and contact rod 70 to a cartridge circuit.

When a cartridge in this circuit is fired the powder gases issuing from the corresponding barrel exert an upward thrust on the ring 202, thereby causing the teeth 198 to become disengaged from the recesses 199 and permitting the sleeve 182 to rotate with respect to the connector unit 18. However, as soon as the energy in the gases has been dissipated the spring 201 returns the sleeve 200 to its normal position, thereby engaging the teeth 198 in the recesses 199 and again holding the sleeve 182 in fixed position.

The tensions in the springs 194 and 201 are such as to permit the sleeve 182 to rotate through a sufficient angle after it has been released to move the sector 186 out of engagement with the rod 191 and into engagement with the rod 191 of the circuit corresponding to another group of cartridges.

In the modification shown in Fig. 23, the conducting rod 188 which is in electrical connection with the conductor 58 of the cable 16 terminates in an enlarged portion 203, the lower surface of which is curved at 204 and which is adapted to engage a spherical conducting ball 205. The conducting ball 205 rests upon a cup-shaped member 206 provided with a tubular shaft 207 which is movable axially in a bushing 208 secured within a tubular member 209 fixed to the connector unit 18, and insulated therefrom by an insulating sleeve 244.

The tubular element 209 is provided with an outwardly extending flange 210 at the lower extremity thereof which is adapted to seat a compression spring 211, the upper end of which is seated in an annular recess 212 formed in the lower face of the cup-shaped member 206, thereby maintaining the spherical ball 205 in good electrical contact with the enlarged portion 203 of the conducting rod 188.

At the lower end of the tubular portion 207 on the cup-shaped member 206 is fitted a contact plate 213 which is continually engaged by the actuator 214 of a commutating switch 216. The actuator 214 is made of conductive material and it serves to complete the circuit from the conducting plate 213 to one element of the switch 216. The switch 216 is adapted to connect the conducting rod 188 selectively to the various conducting rods 70 corresponding to the respective groups of cartridges in the assembled perforator.

In operation, when a cartridge is fired, the impact moves the spherical ball 205 laterally relatively to the perforator assembly thereby moving the cup-shaped member 206 axially against the force of the compression spring 211. This action depresses the actuator 214 of the switch 216 thereby connecting the conducting rod 188 to the next series of cartridges which are to be fired.

The modification illustrated in Fig. 24 is similar to that shown in Fig. 23 except that the spherical ball 205 is replaced by a cylindrical conducting mass 217 which is elastically suspended in the connector unit 18 by suitable supports 218 made of resilient material, such as, for example, rubber. In this modification the switch 216 is provided with an extended actuator 219 which projects into a conical recess 220 formed in the lower face of the cylindrical mass 217. As in the previous case, when the gun is fired, the mass 217 is moved laterally and the conical recess 220 therein depresses the switch actuator 219, thereby disconnecting the conducting rod 188 from one cartridge circuit and connecting it to a different cartridge circuit.

The modification shown in Fig. 25 is similar to that shown in Fig. 22. In this embodiment, however, the sleeve 182 is adapted to be rotated with respect to the connector unit 18 by means of a coil spring 221 which is secured on the connector unit 18 at the point 222. The interior wall of the sleeve 182 is provided with a plurality of spaced recesses 223 within which a transversely extending rod 224 is adapted to be received for the purpose of holding the sleeve 182 in fixed position. The rod 224 is continually urged into engagement with the recess 223 by means of a compression spring 225, the lower end of which is seated within an annular recess 226 formed in the wall of the connector unit 18 and the upper end of which is seated against a disc 227 secured to the rod 224.

A large mass 228 is suspended within the connector unit 18 on an elastic cable 229 and it is connected at its lower end by means of a cable 230 to one arm 231 of a bell crank mechanism 232 which is pivoted at 233. The other arm 234 of the bell crank mechanism 232 is provided with a slot 235 within which a pin 236 on the rod 224 is adapted to be received. The conducting rod 188 which supplies current to the cartridges is connected by means of a conductor 237 to an insulated conducting rod 187 which is maintained in contact with the conducting ring 184 in the sleeve 183.

In operation, when the gun is fired, the shock imparted to the perforator assembly causes the mass 228 to move laterally within the connector unit 18. In so moving the mass 228 causes the bell crank mechanism 232 to pivot about the point 233, thereby moving the arm 234 downwardly and disengaging the rod from its recess 223. This permits the sleeve 182 to rotate under the influence of the compression spring 221 through a sufficient distance to bring the conducting sector 186 into engagement with the conducting rod 70 corresponding to the next cartridge circuit which is to be energized. By this time the weight 228 has returned to its normal position and the rod 224 is again moved into engagement with a recess 223 by the compression spring 225.

While several specific embodiments have been described above, the invention is not intended to be in any way limited thereby but is susceptible of numerous changes in form and detail within the scope of the appended claims.

I claim:

1. A well casing perforator which comprises at least one body member provided with at least two distinct powder-chambers extending substantially longitudinally therein and located in peripheral regions thereof with their transverse axes in close proximity to each other, and means forming at least one barrel hole extending from each of said chambers to the outer wall of said body member and passing through the central portion thereof.

2. A well casing perforator which comprises at least one body member provided with at least two distinct powder-chambers extending substantially longitudinally therein and located in peripheral regions thereof with their transverse axes lying substantially in a common transverse plane, and means forming at least one barrel-hole for each of said chambers extending from the lateral wall of the chamber transversely of the body member and passing through the central portion thereof.

3. A well casing perforator which comprises at least one body member having a longitudinal axis provided with at least two cartridge chambers extending therein with their axes parallel to said longitudinal axis and located in peripheral regions of said body member, and means forming at least one barrel hole for each of said chambers extending in said body member transversely of its axis and passing through the central portion of said body member.

4. A well casing perforator which comprises at least one body member having a longitudinal axis provided with at least three powder chambers extending therein parallel to the axis of the body member and located in peripheral regions thereof, and means forming at least one barrel hole for each of said chambers extending through said body member in a straight line transversely of its axis and passing through the central portion of said body member.

5. A well casing perforator which comprises at least one body member having a longitudinal axis provided with at least three cartridge chambers having their axes parallel to said longitudinal axis and passing through the apices of a regular polygon located in a plane at right angles to said longitudinal axis and means forming at least one barrel hole for each of said chambers extending through said body member in a straight line transversely of its axis and passing through the central portion of said body member.

6. A well casing perforator which comprises at least one body member having a longitudinal axis, provided with at least three powder chambers extending therein substantially parallel to said longitudinal axis and located in peripheral regions thereof, and means forming at least two straight barrel holes for each of said chambers, extending transversely of said body member adjacent the axis thereof but on opposite sides thereof, respectively.

7. A well casing perforator which comprises at least one body member having a longitudinal axis, provided with at least three cartridge chambers having their axes parallel to said longitudinal axis and located in peripheral regions of said body member, means forming at least two straight barrel holes for each of said chambers, extending transversely of said body member adjacent the axis thereof but on opposite sides thereof, respectively.

8. A well casing perforator comprising at least one body member having a longitudinal axis, provided with two powder chambers extending therein substantially parallel to said longitudinal axis, and located in a diametral plane on either side of the axis of said body member, and means forming at least one barrel hole for each of said chambers, extending from the chamber to the outer wall of the body member, each barrel hole having a curved portion and a longer straight portion located in a diametral plane at right angles to the diametral plane of the powder chambers.

9. A well casing perforator which comprises at least one body member having a longitudinal axis, provided with two cartridge chambers having their axes parallel to said longitudinal axis and being located in a diametral plane on either side of the axis of said body member, respectively, and means forming one barrel hole extending from the lateral wall of each of said chambers to the outer wall of said body member, each of said barrel holes having a curved portion and a longer straight portion extending in a diametral plane at right angles to the diametral plane of the powder chambers.

10. A well casing perforator which comprises in combination a plurality of units detachably assembled to one another in consecutive series, each unit being provided with at least two powder chambers and at least one barrel for each of said chambers, and igniting means in each of said units for igniting the powder in the chambers therein, said means being adapted to be interconnected automatically from one unit to the next one upon assembly of said units so as to constitute at least one ignition circuit extending therethrough.

11. A well casing perforator which comprises in combination a plurality of interchangeable units detachably assembled to one another in consecutive series in a longitudinal direction, each unit being provided with at least one powder chamber and at least one barrel hole for said chamber, and electric igniting means in each of said units for igniting the powder in the chamber therein, said means being adapted to be interconnected automatically from one unit to the next one upon assembly of said units so as to constitute at least one ignition circuit extending therethrough.

12. A well casing perforator which comprises in combination a plurality of interchangeable units detachably assembled to one another in consecutive series in a longitudinal direction, each unit being provided with at least one longitudinal powder chamber and at least one barrel hole for said chamber, an igniting filament in each of said chambers, and an electric circuit element extending throughout said unit including said filament, said circuit being adapted to be automatically connected to the corresponding circuit elements of the two adjacent units, upon assembly thereof, so as to constitute at least one ignition circuit extending therethrough.

13. A well casing perforator which comprises in combination a plurality of interchangeable units detachably assembled to one another in consecutive series in a longitudinal direction, each unit being provided with at least one longitudinal powder chamber extending throughout the unit, and at least one barrel hole for said chamber, an electric circuit element, including an igniting filament extending longitudinally throughout each of said chambers, said electric circuit elements being adapted to be automatically interconnected, from one unit to the next, upon assembly of said units, so as to constitute at least one complete ignition circuit extending therethrough.

14. A well casing perforator which comprises in combination a plurality of interchangeable units detachably assembled to one another in consecutive series in a longitudinal direction, each unit being provided with at least one longitudinal cartridge chamber and at least one barrel hole for said chamber, a cartridge in said chamber containing powder, an igniting filament in said cartridge, an electric circuit element, including said filament, extending longitudinally throughout each of said units for igniting the powder in said cartridge, said electric circuit elements being adapted to be automatically interconnected from one unit to the next upon assembly of said units so as to constitute at least one complete ignition circuit extending therethrough.

15. A well casing perforator which comprises in combination a plurality of units detachably assembled to one another in consecutive series in a longitudinal direction, each unit being provided with at least two longitudinal powder chambers extending each throughout said unit and at least one barrel hole for each chamber, and electric igniting means extending longitudinally through each of said chambers, the igniting means of one unit being adapted to be automatically connected with the corresponding means of the next unit, respectively, upon assembly of said units, so as to constitute at least two distinct ignition circuits extending therethrough.

16. A well casing perforator which comprises in combination a plurality of interchangeable units detachably assembled to one another in consecutive series, each unit being provided with at least two powder chambers and at least one barrel for each of said chambers, and igniting means in each of said units for igniting the powder in said chambers, said means being adapted to be automatically interconnected from one unit to the next one upon assembly of said units so as to constitute at least one ignition circuits extending therethrough.

17. A well casing perforator which comprises in combination a plurality of units detachably assembled together in consecutive series in a longitudinal direction, each unit being provided with at least one longitudinal cartridge chamber opening into one end face of said unit and at least one barrel hole for said chamber transverse to said longitudinal direction, a cartridge fitting in said chamber including a tubular case closed at both ends, powder in said tubular case, metallic contact means carried by the rear end part of said case and normally out of contact therewith, electric conductor means extending from said contact means into said case and throughout said unit so as to be connected, upon assembly of said unit with the next one, with the contact means of the corresponding cartridge of said next unit, and a filament inserted in series in said conductor means inside said first mentioned cartridge, said contact means being adapted to be crushed by the pressure of the explosion gases into contact with said rear end part of the cartridge case, so as to afford direct electrical connection with the metal of the unit after the explosion of the cartridge.

18. A well casing perforator which comprises in combination a plurality of metal units detachably assembled together in consecutive series in a longitudinal direction, each unit being provided with at least two longitudinal cartridge chambers opening into one end face of said unit, and at least one barrel hole for said chamber transverse to said longitudinal direction, said units being so arranged that, when assembled together, their cartridge chambers are located along two longitudinal lines respectively, the cartridge in each of said chambers including a tubular case closed at both ends and fitting in said chamber, powder in said tubular case, metallic contact means housed in the rear end part of said case and normally out of contact therewith, electric conductor means extending longitudinally throughout said case from said contact means and including a rod projecting from the front end of the cartridge, said unit being provided with a hole for said rod, so as to enable said rod to bear on the contact means of the corresponding cartridge of the next unit and a filament inserted in series in said conductor means inside said cartridge, said contact means being adapted to be crushed by the pressure of the explosion gases into contact with said rear end part of the cartridge, so as to afford direct electrical connection with the metal of the unit after the explosion of the cartridge.

19. A well casing perforator which comprises in combination a plurality of metal units detachably assembled together in consecutive series in a longitudinal direction, each unit being provided with at least two longitudinal cartridge chambers opening into one end face thereof, and at least one barrel hole for each of said chambers disposed transversely of said longitudinal direction, said units being so disposed that, when assembled together, their cartridge chambers are located along two longitudinal lines, respectively, the cartridge in each of said chambers including a tubular case closed at both ends and fitted in said chamber, powder in said tubular case, metallic contact means housed in the rear end part of said case and normally out of contact therewith, electric conductor means extending longitudinally throughout said case from said contact means and including a rod projecting from the front end of the cartridge, said unit being provided with a hole for said rod, so as to enable said rod to bear on the contact means of the corresponding cartridge of the next unit, a filament inserted in series in said conductor means inside said cartridge, said contact means including a tubular metal element housed in said rear end part of said case with an insulating annular spacing therebetween, and a plug interposed between said contact means and the powder in said case made of a matter adapted to be melted by the temperature and pressure of the powder gases to crush said tubular metal element into contact with said rear end part of said case, so as to afford direct electrical connection with the metal of the unit after the explosion of the cartridge.

20. A well casing perforator which comprises in combination a plurality of units detachably assembled together in consecutive series, each unit being provided with at least one longitudinally extending cartridge chamber, having an opening at one end of said unit, means forming at least one barrel hole for said chamber extending transversely of the unit and extracting means carried by each unit for removing a cartridge from the chamber of the next unit when said two last mentioned units are separated from each other.

21. A well casing perforator which comprises in combination a plurality of interchangeable metal blocks adapted to be screwed one to the other in consecutive series in a longitudinal direction, each block being provided with at least one longitudinal cartridge chamber open at one end of said block, at least one barrel hole for said cartridge chamber transverse to said longitudinal direction and extracting means carried by each block and engaging the cartridge of the next block adapted to extract said cartridge from the last mentioned block when it is unscrewed from the other.

22. A well casing perforator which comprises at least one body member having a longitudinal axis, provided with at least three cartridge chambers having their axes parallel to said longitudinal axis and passing through the apices of a regular polygon and means forming at least one straight barrel hole for each of said chambers extending through said body member transversely thereof and intersecting the axis thereof.

23. A well casing perforator which comprises at least one body member having a longitudinal axis provided with three cartridge chambers having their axes parallel to said longitudinal axis and passing through the apices of an equilateral triangle and means forming at least one straight barrel hole for each of said chambers extending transversely of said body member and intersecting the axis thereof, said barrel holes being located in different transverse planes respectively.

24. In a gun perforator: a gun body having a pair of oppositely directed gun bores intersecting its side walls, and axially oppositely directed cartridge bores intersecting the inner ends of said gun bores and the axial extremities of said gun body; bullets for said gun bores; cartridges for said cartridge bores; and sealing means closing said cartridge bores.

25. In a gun perforator: a gun body having a pair of laterally and diametrically oppositely directed gun bores offset axially from each other and occupying the major portion of the gun body diameter and an individual cartridge chamber extending from each end of each gun body toward each other parallel to but offset from the axis of said gun body and from each other and intersecting the inner end of a corresponding gun bore; bullets for said gun bores; cartridges for said cartridge chambers; and an explosive-resistant plug closing said cartridge chambers.

MARCEL SCHLUMBERGER.